April 12, 1949.　　　J. P. BLEWETT　　　2,467,184
SQUARE VOLTAGE WAVE GENERATOR

Filed July 19, 1943

Inventor:
John P. Blewett,
by Harry E. Dunham
His Attorney.

Patented Apr. 12, 1949

2,467,184

UNITED STATES PATENT OFFICE 2,467,184

SQUARE VOLTAGE WAVE GENERATOR

John P. Blewett, Albany, N. Y., assignor to General Electric Company, a corporation of New York Application July 19, 1943, Serial No. 495,289

5 Claims. (Cl. 250—27)

My invention relates to transmission systems for high frequency energy and it has for its object to provide an improved transmission line for obtaining a desired delay in the transmission of such energy.

In high frequency signalling systems and, in particular, in pulse signalling systems which employ a cathode ray oscilloscope having a sweep circuit, it is desirable to have an effective means for delaying the transmission of a received pulse of signals for an interval of time sufficient to initiate operation of the sweep circuit without distorting the signal to an objectionable degree. It is furthermore desirable that such delay be obtained by a simple circuit and without the necessity of employing intricate and expensive apparatus. Accordingly, it is an object of my invention to provide an improved inductance unit to function as a retardation device in the transmission of high frequency energy.

It is another object of my invention to provide an improved inductance unit having transmission line characteristics.

A further object of my invention is to provide a new and improved transmission line structure operating at a low voltage for obtaining a square wave of voltage of a desired time duration.

A still further object of my invention is to provide an improved transmission line having a high characteristic impedance and a low velocity of propagation.

One of the features of my invention comprises the use of a two layer solenoid in which the component layers are wound in opposite directions and function as the two conductors of a transmission line having a high characteristic impedance and a low velocity of propagation.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a view, partly in section, showing a portion of the transmission line of my invention and Fig. 2 shows diagrammatically a square wave generator employing the transmission line of Fig. 1.

Figure 1:
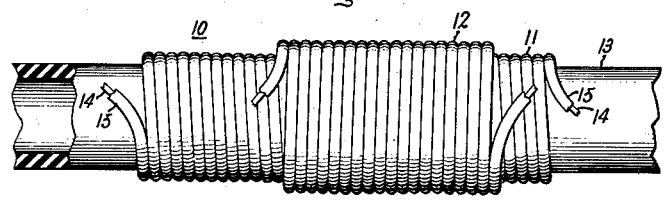
Figure 2:
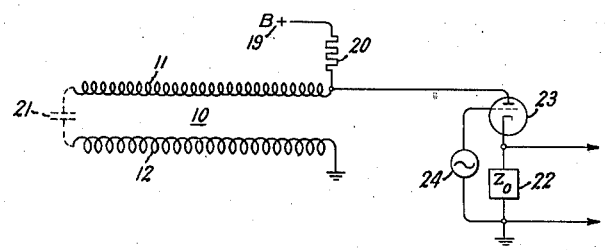

Referring to Fig. 1, I have shown the transmission line 10 as comprising two closely spaced layers 11 and 12 of a closely coiled conductor wound on a supporting insulator 13. The conductors forming the coils 11 and 12, preferably, comprise a solid wire 14 of copper covered with a thin layer of dielectric 15 of any suitable material, such as enamel. The dielectric form 13 may comprise any suitable dielectric material having low losses to high frequency fields and may be formed, for example, of a suitably molded resinous material, such as polyvinylidene chloride. Such a dielectric material is sufficiently rigid that the coils 11 and 12 may be machine wound on the insulator yet flexible enough that it can be coiled on a small radius after winding. While the coils 11 and 12, carried on the form 13, are thus coaxially aligned, the individual coils are wound in opposite directions so that an individual turn of coil 11 lies in a plane which is inclined at an angle to an overlying turn of coil 12.

In a transmission line of this construction, the distributed capacity is the capacity between the two windings 11 and 12. Because the inner and outer conductors pass current in opposite directions and the magnetic fluxes of the two layers add and link both layers, the inductance per unit length of the transmission line is substantially four times the self-inductance per unit length of either of the coils. Since the characteristic impedance $Z_0$ of a transmission line is equal to the quantity $$\sqrt{\frac{L}{C}}$$

where L is the inductance per unit length and C is the capacitance per unit length, it is evident that the characteristic impedance of the transmission line described is relatively large. On the other hand, the velocity of propagation of currents along a theoretically dissipationless transmission line is given by the equation $$\text{Velocity} = \frac{1}{\sqrt{LC}}$$

It is apparent from this equation that, since the value of inductance L of the transmission line described is quite large, the velocity of propagation is small. Hence, a transmission line constructed as outlined above, when used for the transmission of high frequency currents, presents a high characteristic impedance and a low propagation velocity.

Such a transmission line is particularly useful as means to delay a signal for any desired period of time. Thus, by way of example, in a line having a coil 11 whose diameter is 5/8 inch and having 48 turns per centimeter of the coil length, the conductor used comprising a 6.3 mil wire covered with an organic enamel, such as Formvar, the inductance per centimeter was found to be 180 microhenries and the capacitance per centimeter, 130 micromicrofarads. The characteristic impedance of the line was found to be 1200 ohms and the velocity of propagation, $6 \times 10^6$ centimeters per second.

A line of the type described is particularly useful in a pulse signalling system of the type which employs a cathode ray oscilloscope having a sweep circuit where it is desirable to delay the transmission of a received pulse of signals for an interval of time sufficient to initiate operation of the sweep circuit so that the received signal appears on the oscilloscope picture. A one-foot section of the line described above was found to delay a signal by about 5 microseconds. Moreover, it was found to act as a true transmission line to currents of frequencies up to about 50 megacycles. At this frequency, the capacitance reactance between adjacent turns of either coil resonates the inductive reactance of a single turn. Decreasing the coil diameters is effective to permit propagation at higher frequencies. For example, decreasing the coil diameter to ⅛ inch will raise the maximum frequency which can be propagated to about 500 megacycles.

A transmission line of the type described is easily constructed by winding the coils in the usual type of wire winding machine on a flexible dielectric tubing of the type previously mentioned. Very long delays of the order of about 100 microseconds require about 20 feet of line, but since the line is sufficiently flexible that it can be coiled and placed in a relatively small volume, a transmission line of this length is quite practicable for use in high frequency signalling systems. Moreover, since such a transmission line has a high characteristic impedance it may be used as means for coupling high frequency units which are separated physically, thus eliminating the difficulties encountered with impedance matching into the usual type of low impedance transmission line.

In Fig. 2, there is shown means for generating substantially square waves of voltage which employs the transmission line shown in Fig. 1. One end of the inner coil 11 is connected to a suitable source of unidirectional potential 19, indicated by the legend B+, through the decoupling resistance 20. The corresponding end of the outer coil 12 is grounded. The opposite ends of both coils are open-circuited, being coupled at high frequencies by the capacity 21 between the coils. The righthand end of coil 11 is connected across a discharge circuit comprising an impedance 22, having a value equal to the characteristic impedance $Z_0$ of the transmission line 10 connected in series with an electric discharge device 23. The device 23, preferably, is of the type which is filled with an ionizable vapor, such as a thyratron tube. The cathode of device 23 is grounded and a switching or triggering means 24 is connected between the cathode and control grid. The switching means 24 may be any suitable device for cyclically varying the grid potential to the point where current flow in the device 23 is initiated and ionization of the gaseous medium therein occurs.

In the operation of the system of Fig. 2 as a low voltage pulse forming means, the line 10 is charged from the potential source 19 through the resistor 20, the charging time being determined by the value of resistance 20, the device 23 being non-conducting during this charging period. When the switching means 24 increases the potential of the control grid to the point that current flow in device 23 is initiated, the charge accumulated on the transmission line is discharged through its characteristic impedance 22 and the device 23. When the line 10 is thus discharged through its characteristic impedance, it generates a substantially square voltage pulse whose duration is determined by the length of the line 10. The leading edge of such a pulse rises sharply and its trailing edge drops substantially just as sharply since, when the voltage wave travelling along the line, after reflection at the open circuited end, reaches the device 23, energy of the line is completely dissipated.

In a square wave generator of the type described and employing a transmission line in which the diameter of inner coil 11 was ⅙ inch and the coils consisted of 48 turns of 6.3 mil organic enamel-covered wire per centimeter length, the inductance of the line was found to be 2 microhenries per centimeter and its capacitance, 20 micromicrofarads per centimeter. The characteristic impedance of the line was 300 ohms and its velocity of propagation, $1.4 \times 10^8$ centimeters per second. A line of this type, one foot in length, when discharged into its characteristic impedance, generated a voltage pulse one microsecond long, the pulse being substantially square in form.

While I have shown a particular embodiment of my invention, it will of course be understood that I do not wish to be limited thereto since various modifications may be made, and I contemplate by the appended claims to cover any such modifications as fall within the true spirit and scope of my invention.

What I claim as new and desire to secure by Letters Patent of the United States is:

1. A transmission line having a high characteristic impedance and a low velocity of propagation for currents thereon comprising, a pair of uniformly wound coaxial and closely spaced coils of insulated conductors, said coils being wound in opposite directions, adjacent turns of the respective coils being substantially in contact throughout the length of said line.

2. A transmission line having a high characteristic impedance and a low propagation velocity comprising a first uniform coil of closely wound turns of a conductor, a second uniform coil of closely wound turns of a conductor closely wound on said first coil, the turns of each of said coils being insulated from each other and said second coil being wound in a direction opposite to the direction of said first coil.

3. A delay circuit for high frequency currents comprising a pair of closely spaced coaxial windings of conductive material, each of said windings being formed of closely spaced turns of said material, said turns being substantially in contact and insulated from each other, the turns of the outer of said windings being wound in a direction opposite to that of the turns of the inner of said windings, and said windings forming a section of transmission line of high characteristic impedance and low propagation velocity.

4. In combination, an elongated supporting form of dielectric material having a substantially circular outer periphery, a first coil of an insulated conductor closely wound on said form and a second coil of an insulated conductor closely wound on said first coil in a direction opposite to the direction of winding of said first coil and forming with said first coil a transmission line having a high characteristic impedance and a low velocity of propagation for currents thereon, adjacent turns of the respective coils being substantially in contact throughout the length of said line.

5. In a generator of substantially square waves of voltage including an electron discharge device having an anode, a cathode, and a control electrode, and switching means connected between said control electrode and cathode, a balanced transmission line connected between said cathode and said anode through an impedance, said transmission line comprising a pair of coaxial and closely spaced coils of insulated conductors, said coils being wound in opposite directions, and a source of unidirectional potential connected across said coils, said impedance having a value equal to the characteristic impedance of said transmission line, said source having a positive terminal connected to said anode and one end of a first of said coils and a negative terminal connected to the corresponding end of the other of said coils and said impedance.

JOHN P. BLEWETT.

REFERENCES CITED

The following references are of record in the file of this patent:

UNITED STATES PATENTS

| Number | Name | Date |
|---|---|---|
| 623,579 | Stone | Apr. 25, 1899 |
| 957,213 | Jodrey | May 10, 1910 |
| 995,588 | Cuntz | June 20, 1911 |
| 1,170,811 | Hay | Feb. 8, 1916 |
| 1,865,840 | Croft et al. | July 5, 1932 |
| 2,178,653 | Slade | Nov. 7, 1939 |
| 2,263,376 | Blumlein et al. | Nov. 18, 1941 |
| 2,405,069 | Tonks et al. | July 30, 1946 |

FOREIGN PATENTS

| Number | Country | Date |
|---|---|---|
| 22,152 | Great Britain | Aug. 7, 1902 |
| 10,036 | Great Britain | June 2, 1904 |